Patented Nov. 24, 1931

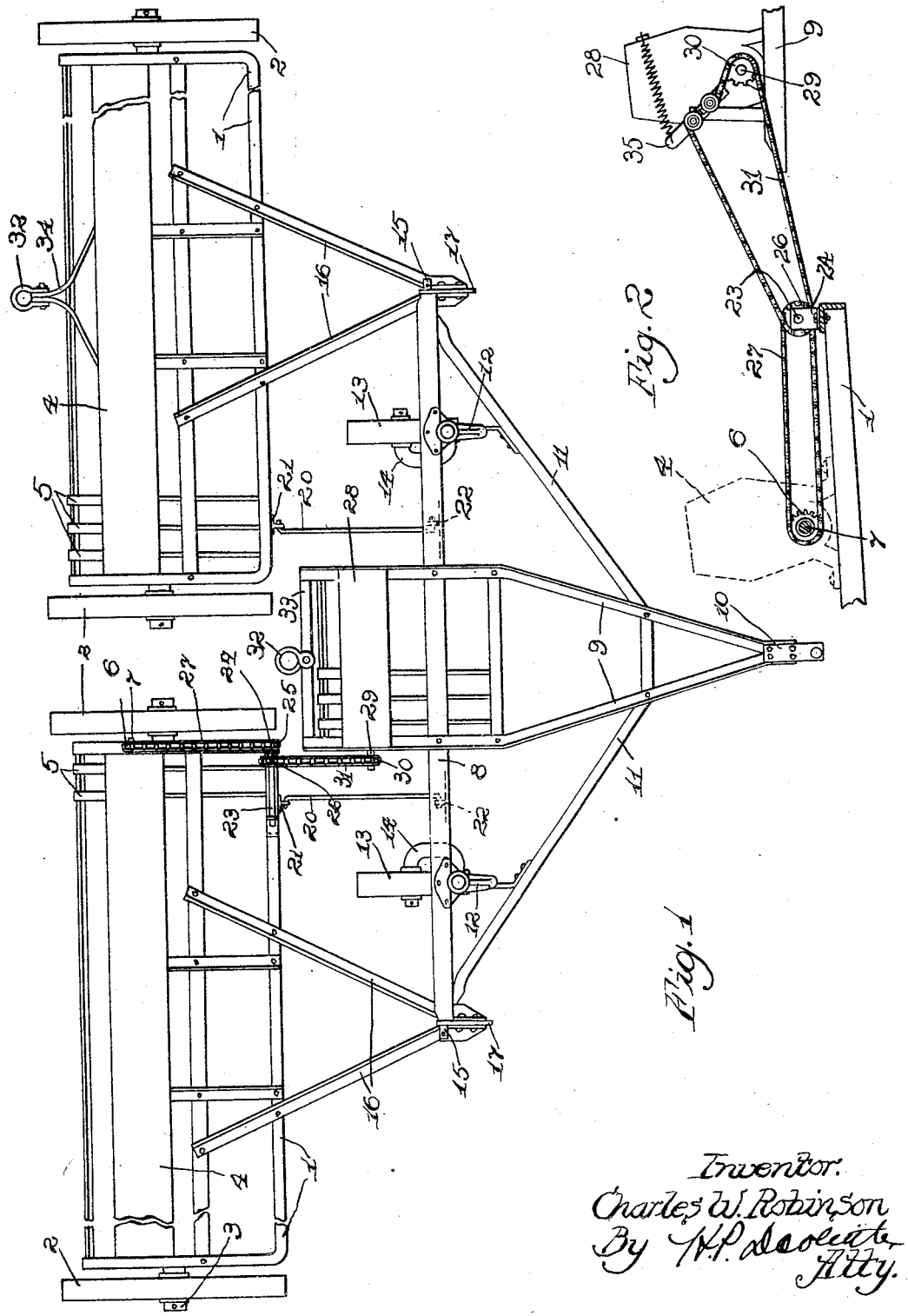

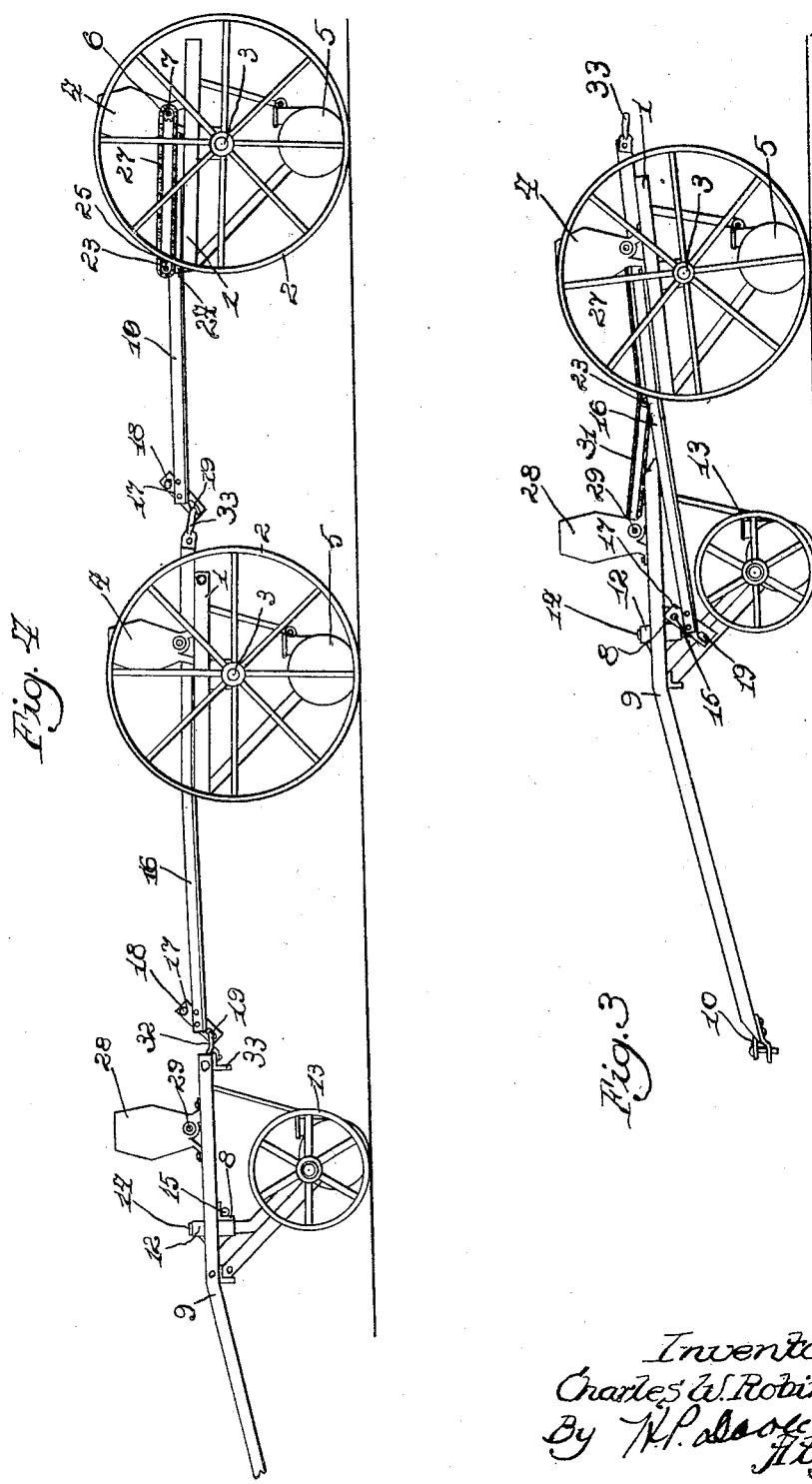

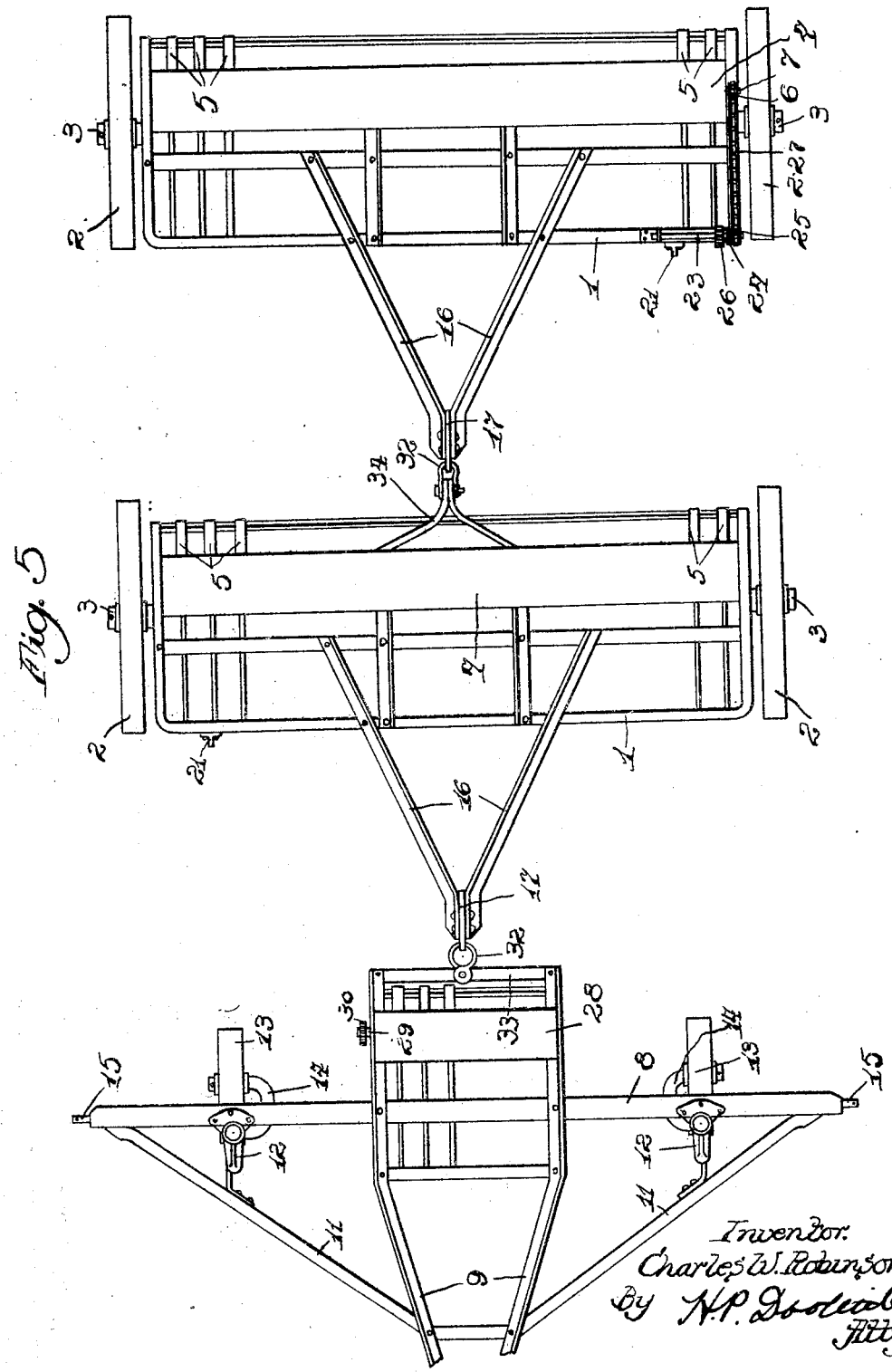

1,832,946

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

GRAIN DRILL

Application filed July 23, 1930. Serial No. 470,214.

This invention relates to a grain drill. More specifically it relates to a multiple unit drill adapted to be drawn by a tractor.

The principal object of the invention is to provide an improved multiple section drill adapted to seed wide areas.

Another object is to provide a wide multiple unit drill which will have the desired flexibility for operating over uneven ground.

Another object is to provide an improved arrangement for seeding the space between adjacent drill units spaced end to end.

Another object is to provide a sectional drill of such a construction that it may readily be taken apart and connected with the units in trailing relationship for transportation.

Another object is to provide improved means for driving a forwardly mounted seeding mechanism by an operative connection with the seeding mechanism of a trailing drill unit.

Other objects will be apparent from the following detailed description.

In the drawings—

Figure 1 is a plan view of the drill of this invention;

Figure 2 is an enlarged detail, showing the driving means for the forward fill-in seeding mechanism;

Figure 3 is a side elevation of the drill shown in Figure 1;

Figure 4 is a side elevation, showing the units of the drill of Figure 1 connected in trailing relation for transportation; and, Figure 5 is a plan of the drill sections arranged in transporting relationship.

Two grain drills of a conventional construction are utilized in constructing the improved wide seeding drill of this invention. Each of said drills, or units, as they will be hereinafter referred to, is of a conventional construction. An angle bar frame structure 1 is provided with wheels 2 mounted on axles 3 connected to the frame structure 1. A seed hopper 4 is mounted on each of the units. A seeding mechanism, not shown in detail, is provided on the frame structure below each of the seed hoppers. Said mechanism is adapted to deliver seed from the hopper in regulated amounts to the furrow opening and seed depositing mechanism 5 attached to the frame structure and operating therebelow. A chain sprocket 6 mounted on the end of the shaft 7, which is an element of the seeding mechanism of one of the drill units, provides means for driving the auxiliary, forwardly attached seeding mechanism, as will be hereinafter described.

A forwardly positioned draft frame structure provides means for drawing the spaced drill units positioned to the rear thereof. The frame structure consists essentially of a transversely extending bar 8 and a pair of bars 9, which extend forwardly and rearwardly from the bar 8 and are bent together at their forward ends. A hitching member 10 is connected to the forward ends of the bars 9 and is provided with means for being attached to the drawbar of a tractor. Brace bars 11 are connected to the outer ends of the bar 8 and to forward points on the bars 9.

A bracket structure 12 attached at each end of the bar 8 and to the corresponding bar 11 provides means for swivelly mounting a wheel 13 on a shaft 14. These wheels provide a swivel rolling support for the frame structure. At the outer ends of the bar 8, pinions 15 are provided, to which the trailing units are attached. Angularly extending bars 16 connected to each of the frames 1 of the trailing units are clamped to an angularly positioned bar 17. The bar 17 extends downwardly forward from the bar 16 and upwardly rearwardly therefrom. An opening 18 is provided in the upper portion which is utilized for connecting the drill unit to the pinion 15 on the end of the bar 8. An opening 19 is provided in the lower portion of the bar 17 for attaching the unit in trailing relation when the drill is arranged for transportation. Links 20, connected to the forward sides of the frames 1 of the trailing drill units by means of brackets 21, and to the bar 8 on the forward frame structure by means of brackets 22, provide means for preventing relative angular movement of the trailing drill units with respect to the forward frame structure about vertical axes.

As best shown in Figure 2, a shaft 23 mounted in a bracket 24 on the forward frame structure is provided with chain sprockets 25 and 26. The chain sprocket 25 is connected by a chain 27 with the sprocket 6 on the drill unit.

On the portion of the bars 9, which extend rearwardly from the transverse bar 8, a short seed dispensing unit of a conventional construction is mounted. Said seed dispensing mechanism is provided with a hopper 28 mounted on the frame structure and a shaft 29 which is adapted to drive the seeding mechanism. A sprocket 30 is mounted on the shaft 29 in alignment with the sprocket 26 on the shaft 23. A chain 31 connects said sprockets.

Figures 4 and 5 show the drill with the units detached and arranged in trailing relation behind the frame structure, which itself is a unit of substantially the same lateral width as one of the drill units. To arrange for transportation, the links 20 are removed and the bars 17 are unhooked from the ends of the transverse bar 8 on the frame structure. One of the units is attached by means of a clevis 32 to a bar 33 connected across the rear ends of the bars 9 on the forward frame structure. The clevis 32 is connected to the bars 17 extending through the opening 19. The second unit is connected behind the first by a similar clevis to a hitch means 34, which is provided at the rear of one of the drill units.

The operation of the device of this invention will be clear from the foregoing detailed description. The two rear trailing drills are driven in a conventional manner by power drive connections with one of the wheels which supports the drill. The forward unit, which is adapted to seed the space between the ends of the rear units, is driven by power transmitted through the chain sprockets and through the chains 27 and 31 to the shaft 29, which operates the seeding mechanism of the forward unit.

It will be understood that, due to the desirable lateral flexibility of the forward frame structure, it is necessary to have the swiveled rolling supports therefor. Because of this construction, means for driving the forward seeding mechanism from one of the rear units has been devised. The links 20 prevent angular movement of the rear units with respect to the forward frame structure. This construction permits the use of the chain 31 for transmitting power to the forwardly positioned seeding mechanism. Angular flexibility of the rear unit with respect to the forward unit is also provided for by said links. This movement necessitates a longitudinal flexibility of the chain 31. To provide for this, a spring tension idling means 35 is attached to the frame structure adjacent the forward unit. As will be seen from the construction shown in Figure 2, the idling means has a sufficient range to allow the necessary angular movement of the rear unit, on which the drive mechanism is mounted, with respect to the frame structure about an axis in the line of draft.

It is to be understood that applicant has shown only a preferred embodiment of his improved device and that he claims as his invention all modifications thereof falling within the scope of the appended claims.

What is claimed is:

1. A grain drill comprising a frame structure provided with rolling supports, means for attaching said structure to a draft means, means for securing wheeled drill units to said frame structure, the adjacent ends of the seeding means on said units terminating in spaced relation to each other, seeding means mounted on the frame structure and bridging the space between the ends of the seeding means on the trailing units, and means for actuating said seeding means by an operative connection with one of the trailing units.

2. A grain drill comprising a forward draft frame provided with rolling supports, means for attaching said frame to a draft means, means for detachably securing wheeled drill units behind said frame structure with the seed dispensing means thereon in alignment and the adjacent ends of said units in spaced relation to each other, seeding means mounted on the forward frame structure equal in length to the space between the ends of the trailing units, and detachable means for actuating said seeding means by an operative connection with one of the rear units.

3. A grain drill comprising a forward draft frame having swiveled rolling supports, means for attaching the forward portion of said frame to a draft means, means for detachably securing wheeled drill units to the ends of said frame structure, said units being in transverse alignment and trailing behind the draft frame with their inner ends in spaced relation to each other, seeding means mounted on the draft frame adapted to seed the space between the inner ends of the trailing units, and means for actuating said seeding means operatively connected to one of the trailing units.

4. A grain drill comprising a forward draft frame provided with swiveled rolling supports, means for attaching said frame to a draft means, means for detachably securing wheeled drill units behind said frame structure in transverse alignment, said means including means for holding said units against angular movement with respect to the frame structure and with the inner ends of said units in spaced relation to each other, and seeding means mounted on the draft frame adapted to seed the space between the inner ends of the trailing units.

5. A grain drill comprising a forward draft frame provided with swiveled rolling supports, means for attaching said frame to a draft means, means for detachably securing wheeled drill units behind said frame, said means including means for holding said units against angular movement with respect to the draft frame, the adjacent ends of said units terminating in spaced relation to each other, seeding means including seeding mechanism mounted on the draft frame adapted to seed the space between the ends of the trailing units, and means for driving the seeding mechanism of said seeding means on the draft frame by a detachable operative connection with one of the rear units.

In testimony whereof I affix my signature.

CHARLES W. ROBINSON.